United States Patent
Utashiro et al.

(10) Patent No.: US 9,789,634 B2
(45) Date of Patent: Oct. 17, 2017

(54) SHEET PRESS MOLDING METHOD AND METHOD OF MANUFACTURING FUEL CELL SEPARATOR

(75) Inventors: Tomoya Utashiro, Oyama (JP); Yoshinori Ito, Tokyo (JP); Masayuki Noguchi, Kawasaki (JP)

(73) Assignee: SHOWA DENKO K.K., Tokyo (JP)

( * ) Notice: Subject to any disclaimer, the term of this patent is extended or adjusted under 35 U.S.C. 154(b) by 548 days.

(21) Appl. No.: 13/260,662

(22) PCT Filed: Mar. 29, 2010

(86) PCT No.: PCT/JP2010/002277
§ 371 (c)(1),
(2), (4) Date: Sep. 27, 2011

(87) PCT Pub. No.: WO2010/116674
PCT Pub. Date: Oct. 14, 2010

(65) Prior Publication Data
US 2012/0025420 A1   Feb. 2, 2012

(30) Foreign Application Priority Data
Mar. 30, 2009 (JP) ................. 2009-082279

(51) Int. Cl.
*B29C 43/02* (2006.01)
*H01M 8/0213* (2016.01)
(Continued)

(52) U.S. Cl.
CPC .......... *B29C 43/021* (2013.01); *H01M 8/026* (2013.01); *H01M 8/0213* (2013.01);
(Continued)

(58) Field of Classification Search
CPC .................. B29C 33/424; B29C 43/021
(Continued)

(56) References Cited

U.S. PATENT DOCUMENTS

| 4,737,421 A | 4/1988 | Uemura et al. |
| 4,988,583 A * | 1/1991 | Watkins et al. ............... 429/492 |

(Continued)

FOREIGN PATENT DOCUMENTS

| CN | 1466790 A | 1/2004 |
| CN | 101103480 A | 1/2008 |

(Continued)

OTHER PUBLICATIONS

Notice of Allowance with a mailing date of Dec. 14, 2012 for corresponding Korean Patent Application No. 10-2011-7022621.
(Continued)

*Primary Examiner* — Matthew Daniels
*Assistant Examiner* — Patrick Butler
(74) *Attorney, Agent, or Firm* — Sughrue Mion, PLLC

(57) ABSTRACT

Provided is a sheet press molding method by which a molded product having a small plate thickness deviation is obtained. Such a sheet press molding method is provided with a process in which a molded product (30) having a recess and protrusion pattern portion (32), to which a recess and protrusion pattern (3) is transferred, is formed by pressurizing a sheet-shaped material (20) including 60 vol. % to 95 vol. % of a filler and a resin composition using a pair of molds (40) having the predetermined recess and protrusion pattern (3) composed of recessed portions (3a, 3b, and 3c) and protrusion portions (23a, 23b, 23c, and 23d) in at least one of a pair of the molds, in which the mold provided with a dummy pattern (24) composed of dummy protrusion portions (24a) that offset the difference between the total volume of the protrusion portions (23a, 23b, 23c, and 23d) formed on the inside (14) and the total volume of the recessed portions (3a, 3b, and 3c) disposed between the protruding portions (23a, 23b, 23c, and 23d) and the side surfaces (14b) of the inside (14) and the recessed portions
(Continued)

($3a$, $3b$, and $3c$) disposed between the protruding portions ($23a$, $23b$, $23c$, and $23d$) on the inside (14) is used as a pair of the molds (40).

11 Claims, 7 Drawing Sheets

(51) Int. Cl.
*H01M 8/0221* (2016.01)
*H01M 8/0226* (2016.01)
*H01M 8/026* (2016.01)
*H01M 8/1018* (2016.01)
*B29L 31/34* (2006.01)
*B29K 105/16* (2006.01)
*B29K 105/00* (2006.01)

(52) U.S. Cl.
CPC ....... *H01M 8/0221* (2013.01); *H01M 8/0226* (2013.01); *B29C 2043/025* (2013.01); *B29K 2105/16* (2013.01); *B29K 2105/256* (2013.01); *B29L 2031/3468* (2013.01); *H01M 2008/1095* (2013.01); *Y02P 70/56* (2015.11)

(58) Field of Classification Search
USPC .................. 264/105, 293, 299, 320; 429/535
See application file for complete search history.

(56) References Cited

U.S. PATENT DOCUMENTS

| | | |
|---|---|---|
| 2003/0191228 A1 | 10/2003 | Noguchi et al. |
| 2004/0023095 A1* | 2/2004 | Middelman et al. ........... 429/34 |
| 2008/0318114 A1 | 12/2008 | Lee et al. |

FOREIGN PATENT DOCUMENTS

| | | |
|---|---|---|
| EP | 1 118 442 A2 | 7/2001 |
| EP | 2 017 912 A1 | 1/2009 |
| JP | 60-161144 A | 8/1985 |
| JP | 08-222241 A | 8/1996 |
| JP | 2000-021422 A | 1/2000 |
| JP | 2000-082475 A | 3/2000 |
| JP | 2001-068128 A | 3/2001 |
| JP | 2003-176327 A | 6/2003 |
| JP | 2004-22207 A * | 1/2004 ............. H01M 8/02 |
| JP | 2005-339874 A | 12/2005 |
| JP | 2006-252815 A | 9/2006 |
| JP | 2006-294407 A | 10/2006 |
| JP | 2009-006619 A | 1/2009 |
| KR | 10-2008-0111695 A | 12/2008 |
| KR | 10-0882701 B1 | 2/2009 |
| KR | 10-2009-0031946 A | 3/2009 |
| WO | 03/047016 A2 | 6/2003 |

OTHER PUBLICATIONS

Chinese Office Action with a mailing date of Jul. 1, 2013 for corresponding Chinese Patent Application No. 201080015361.3.

Communication, dated Jun. 29, 2016, from the European Patent Office in counterpart European application No. 10761380.4.

* cited by examiner

SHEET PRESS MOLDING METHOD AND METHOD OF MANUFACTURING FUEL CELL SEPARATOR

CROSS REFERENCE TO RELATED APPLICATIONS

This application is a National Stage of International Application No. PCT/JP2010/002277 filed Mar. 29, 2010, claiming priority based on Japanese Patent Application No. 2009-082279 filed Mar. 30, 2009, the contents of all of which are incorporated herein by reference in their entirety.

TECHNICAL FIELD

The present invention relates to a sheet press molding method and a method of manufacturing a fuel cell separator. In more detail, the invention relates to a sheet press molding method in which a resin composition sheet containing a filler in a high concentration is used and a method of manufacturing a fuel cell separator in which a resin composition sheet containing a carbonaceous material in a high concentration is used.

Priority is claimed on Japanese Patent Application No. 2009-082279, filed Mar. 30, 2009, the content of which is incorporated herein by reference.

BACKGROUND ART

In recent years, a sheet press molding method has been drawing attention as a method of molding thin and large-area products, and has been used for, for example, molding of fuel cell separators. Hereinafter, the sheet press molding method will be described with reference to an example of a method of manufacturing a fuel cell separator.

A fuel cell is a clean power generation apparatus that generates power by the reverse reaction of water electrolysis, in which hydrogen and oxygen are used, and produces no emissions other than water, and is thus gaining attention from the viewpoint of environmental issues and energy issues. Fuel cells are classified into several types depending on the type of an electrolyte being used. Among fuel cells, a solid polymer electrolyte fuel cell operating at a low temperature seems most promising for automobiles or consumer use. Generally, this fuel cell has a basic unit of a single cell including a solid polymer membrane acting as a solid polymer electrolyte, a membrane-electrode assembly (MEA) formed by integrating gas diffusion electrodes that support a pair of catalysts interposing the solid polymer membrane, and a separator interposed from the outside of the MEA so as to separate a fuel gas and an oxidized gas. In addition, high-output power generation can be attained by stacking a number of the single cells in a fuel cell.

Gas flow channels (grooves) are provided on the surface of the separator composing the above fuel cell, which is in contact with the MEA, to supply a reactant gas to the gas diffusion electrode surfaces and carry away produced gas or excessive gas. Using these gas flow channels, hydrogen, which is a fuel, is supplied to one gas diffusion electrode side, an oxidant gas, such as oxygen or air, is supplied to the other gas diffusion electrode side, and an external load circuit is connected between the two gas diffusion electrodes, making it possible for a device having the above configuration to be operated as a fuel cell.

Therefore, the separator needs to be excellent in terms of thermal conductivity, strength, and the like in addition to being sufficiently highly gas impermeable to completely separate the gases and being highly electrically conductive enough to reduce internal resistance. In addition, since the fuel cell is composed by stacking a number of single cells as described above, there is demand for a decrease in the weight and thickness of the separator.

Thus far, metallic materials and carbonaceous materials have been studied as a material for the fuel cell separator in order to meet the demand. Metallic materials are excellent in terms of mechanical properties, and thus have an advantage of an ability to obtain a thin separator or a high electrical conductivity. However, metallic materials have a large specific gravity, and are insufficient in terms of corrosion resistance as well.

Carbonaceous materials are light and highly electrically conductive materials that are excellent in terms of thermal conductivity, strength, and the like, and studies are underway regarding thin molding techniques or mass production of carbonaceous materials.

For example, PTL 1 discloses a cumbersome process in which a binder is added to carbonaceous powder, the two are heated, mixed and then subjected to cold isostatic pressing (CIP), an isotropic graphite material obtained by firing and graphitizing the above mixture is impregnated with a thermosetting resin and subjected to a curing treatment, and then the material is subjected to slice machining, thereby producing a separator for a solid polymer electrolyte fuel cell. In addition, PTL 2 discloses a method of manufacturing a thin carbon plate in which paper including carbon powder or carbon fiber is impregnated with a thermosetting resin, and plural sheets of the paper are laminated, pressed, cured, and fired. In addition, PTL 3 discloses a method of manufacturing a fuel cell separator in which a phenol resin molding material is injection-molded using a mold, and the obtained molded product is fired.

However, fired materials are used as a material for the fuel cell separator in the techniques described in PTL 1 to 3. Fired materials exhibit a high electrical conductivity and high thermal resistance, but have a problem of a tendency of brittle fracture or a problem of poor productivity due to the long time necessary for firing. Furthermore, as described in PTL 1, since materials requiring cutting machining, such as slice machining, in a process of manufacturing a separator become more deficient in productivity, and costs become high, the materials have many difficulties becoming widespread in the future.

As a technique to solve this problem, a method of manufacturing a fuel cell separator by, for example, performing sheet press molding in which a sheet-shaped material including an electrically conductive carbonaceous material is press-molded is suggested. Such a method is excellent in terms of productivity, and, in particular, is preferably used when manufacturing thin separators.

However, when a fuel cell separator is manufactured by press molding of a sheet-shaped material including a carbonaceous material, since variation in the bulk density among obtained fuel cell separators is large, there is a disadvantage of large variation in electrical conductivity, mechanical strength, airtightness, and the like.

As a technique to solve this problem, for example, PTL 4 discloses a method of manufacturing a fuel cell separator in which a first sheet made of a flexible graphite sheet and a second sheet made of a flexible graphite sheet, whose portions corresponding to flow channels are removed, are laminated, and press molding is performed on the laminated sheets, thereby forming flow channels and through-holes, and achieving an increase in the bulk density of the peripheral areas. In addition, PTL 5 discloses a technique in which protrudings and recesses are formed on the surface of an expanded graphite sheet so that the density difference of expanded graphite becomes less than 30%, and then a fuel cell separator is formed using a press having a shape matching the recess and protrusion-shaped portion from an expanded graphite compact formed into a predetermined recess and protrusion form.

However, as a material used for the fuel cell separator, a flexible graphite sheet is used in PTL 4, and an expanded graphite sheet is used in PTL 5. Since the flexible graphite sheet and the expanded graphite sheet are porous, the two have an intrinsic problem of the bulk density difference in portions of the obtained compact having different thicknesses when a recess and protrusion pattern is press-molded using the above sheets. Therefore, there has been a demand for a further decrease in the variation of characteristics resulting from the variation of the bulk density among fuel cell separators. In addition, the flexible graphite sheet and the expanded graphite sheet have a disadvantage of a tendency of having surface defects, such as cracking and blisters, being created by press molding.

As a technique to solve this problem, there is a method in which a molded product is obtained by press molding of a sheet-shaped material including a resin composition and a carbonaceous material. For example, PTL 6 discloses a fuel cell separator made of a cured article obtained by curing with a compression molding machine an uncured sheet that is molded using a electrically conductive curable resin composition including a curable resin composition, including elastomer having a Mooney viscosity ($ML_{1+4}$ (100° C.)) of 25 or higher, and a carbonaceous material in a mass ratio of 70:30 to 5:95.

As such, when a material including a resin composition and a carbonaceous material is used as the sheet-shaped material, the variation in the characteristics of molded products obtained by performing press molding can be reduced, and defects are also prevented during press molding in comparison to the case of using the flexible graphite sheet and the expanded graphite sheet.

PATENT LITERATURE

[PTL 1] JP-A-8-222241
[PTL 2] JP-A-60-161144
[PTL 3] JP-A-2001-68128
[PTL 4] JP-A-2000-21422
[PTL 5] JP-A-2000-82475
[PTL 6] JP-A-2003-176327

SUMMARY OF INVENTION

Technical Problem

However, when the content of a filler, such as a carbonaceous material, is large, the sheet-shaped material including the filler and a resin composition in the related art had a problem in that the moldability becomes extremely poor when manufacturing a molded product having a refined pattern by press molding of the above material, and the plate thickness deviation of the molded product thus increases. This problem occurs similarly even when the filler is another substance, such as silica or alumina, as well as when the filler is a carbonaceous material.

Meanwhile, in recent years, there has been a tendency of gas flow channel patterns in fuel cell separators being refined in order to improve the power generation efficiency of a fuel cell. However, when fuel cell separators having a refined gas flow channel pattern are manufactured by press molding of a sheet-shaped material including a resin composition and a carbonaceous material in the related art, the problem of the increase in the plate thickness deviation of the separator occurs since the moldability of the sheet-shaped material is poor as described above. In addition, regarding fuel cell separators, since a large number of single cells provided with the separator are laminated to allow a fuel cell to achieve high-output power generation, there are cases in which the thickness variation becomes extremely large in a state in which the single cells are laminated even when the plate thickness deviation of the respective separators is small, which created a problem.

In addition, in order to obtain a high electrical conductivity in the sheet-shaped material including a resin composition and a carbonaceous material in the related art, it is necessary to contain a large amount of carbonaceous material. However, when the combination amount of the carbonaceous material included in the sheet-shaped material is increased, the strength of a molded product obtained when the sheet-shaped material is press-molded is degraded accordingly. Therefore, there were cases in which a molded product having sufficiently high strength and electrical conductivity as a fuel cell separator cannot be obtained even when the sheet-shaped material including a resin composition and a carbonaceous material in the related art is used.

The invention has been made to solve the above problems, and an object of the invention is to provide a sheet press molding method by which a molded product having a small plate thickness deviation can be obtained when manufacturing the molded product by press molding of a sheet-shaped material including a filler and a resin composition even when the sheet-shaped material includes a large amount of filler.

In addition, another object of the invention is to provide a method of manufacturing a fuel cell separator by which a fuel cell separator having a thin thickness, a small plate thickness deviation, a high strength, and a high electrical conductivity can be manufactured efficiently by press molding of a sheet-shaped material including a carbonaceous material and a resin composition even when the sheet-shaped material includes a large amount of carbonaceous material in order to obtain a high electrical conductivity, and which is excellent in terms of productivity.

Solution to Problem

That is, the invention includes, for example, the following [1] to [10] items.

[1] A sheet press molding method in which a process is provided for forming a molded product having a recess and protrusion pattern portion, to which a recess and protrusion pattern is transferred, by pressurizing a sheet-shaped material including a resin composition and 60 vol. % to 95 vol. % of a filler using a pair of molds, at least one of which has a predetermined recess and protrusion pattern composed of recessed portions and protruding portions, and a pair of molds provided with a dummy pattern composed of dummy recessed portions or dummy protruding portions which offset the difference between the total volume of protruding portions formed on the inside and the total volume of recessed portions disposed between the protruding portions and the side surfaces of the inside and between the protruding portions on the inside is used as a pair of the molds.

[2] The sheet press molding method according to [1], in which the total volume of the protruding portions is smaller than the total volume of the recessed portions, and the dummy pattern is composed of dummy protruding portions.

[3] The sheet press molding method according to [1] or [2], in which the dummy pattern is provided at a plurality of areas.

[4] The sheet press molding method according to any of [1] to [3], in which the sheet-shaped material has a uniform thickness.

[5] The sheet press molding method according to any of [1] to [4], in which the filler is a carbonaceous material.

[6] The sheet press molding method according to [2], in which the height of the dummy protruding portions is the same as the height of the protruding portions in the recess and protrusion pattern.

[7] A method of manufacturing a fuel cell separator, in which a process is provided for forming a fuel cell separator having a flow channel pattern, to which a recess and protrusion pattern is transferred, by pressurizing a sheet-shaped material including a resin composition and 80 vol. % to 98 vol. % of a carbonaceous material using a pair of molds, at least one of which has a predetermined recess and protrusion pattern composed of recessed portions and protruding portions, and a pair of molds provided with a dummy pattern composed of dummy recessed portions or dummy protruding portions which offset the difference between the total volume of protruding portions formed on the inside and the total volume of recessed portions disposed between the protruding portions and the side surfaces of the inside and between the protruding portions on the inside is used as a pair of the molds.

[8] The method of manufacturing a fuel cell separator according to [7], in which the total volume of the protruding portions is smaller than the total volume of the recessed portions, and the dummy pattern is composed of dummy protruding portions.

[9] The method of manufacturing a fuel cell separator according to [7] or [8], in which the dummy pattern is provided at a plurality of areas.

[10] The method of manufacturing a fuel cell separator according to any of [7] to (9), in which the dummy pattern is provided at locations corresponding to areas that become gas supply holes of the fuel cell separator.

[11] The method of manufacturing a fuel cell separator according to [8], in which the height of the dummy protruding portions is the same as the height of the protruding portions in the recess and protrusion pattern.

Advantageous Effects of Invention

Since the sheet press molding method of the invention is a method in which a process is provided for forming a molded product having a recess and protrusion pattern portion, to which a recess and protrusion pattern is transferred, by pressurizing a sheet-shaped material including a resin composition and 60 vol. % to 95 vol. % of a filler using a pair of molds, at least one of which has a predetermined recess and protrusion pattern composed of recessed portions and protruding portions, and a pair of molds provided with a dummy pattern composed of dummy recessed portions or dummy protruding portions which offset the difference between the total volume of protruding portions formed on the inside and the total volume of recessed portions disposed between the protruding portions and the side surfaces of the inside and between the protruding portions on the inside is used as a pair of the molds, the volume of protruding portions in the molded product becomes the same as the volume of recessed portions in the molded product, and the softened sheet-shaped material pressurized on the protruding portions of the mold and pressed out is smoothly flowed into portions facing the recessed portions of the mold when performing the pressing process. As a result, according to the sheet press molding method of the invention, a molded product having a small plate thickness deviation can be obtained when the molded product is manufactured by press molding of a sheet-shaped material including a filler and a resin composition regardless of the sheet-shaped material includes a large amount of filler or has a refined recess and protrusion pattern.

In addition, since the method of manufacturing a fuel cell separator of the invention is a method in which a process is provided for forming a fuel cell separator having a flow channel pattern, to which a recess and protrusion pattern is transferred, by pressurizing a sheet-shaped material including a resin composition and 80 vol. % to 98 vol. % of a carbonaceous material using a pair of molds, at least one of which has a predetermined recess and protrusion pattern composed of recessed portions and protruding portions, and a pair of molds provided with a dummy pattern composed of dummy recessed portions or dummy protruding portions which offset the difference between the total volume of the protruding portions formed on the inside and the total volume of the recessed portions disposed between the protruding portions and the side surfaces of the inside and between the protruding portions on the inside is used as a pair of the molds, the volume of protruding portions in the fuel cell separator becomes the same as the volume of recessed portions in the fuel cell separator, and the softened sheet-shaped material pressurized on the protruding portions of the mold and pressed out is smoothly flowed into portions facing the recessed portions of the mold when performing the pressing process. As a result, according to the method of manufacturing a fuel cell separator of the invention, a fuel cell separator having a small plate thickness deviation, a high strength, and a high electrical conductivity can be obtained by using a sheet-shaped material including a large amount of carbonaceous material as the sheet-shaped material including a carbonaceous material and a resin composition and performing press molding of the sheet-shaped material.

In addition, since the fuel cell separator having a flow channel pattern is formed by pressurizing the sheet-shaped material using a pair of the molds in the method of manufacturing a fuel cell separator of the invention, a fuel cell separator having a thin thickness can be obtained, and also can be efficiently manufactured in comparison to cases in which firing or cutting machining is performed.

BRIEF DESCRIPTION OF DRAWINGS

FIG. 1A is a cross-sectional view showing an example of a mold used in the sheet press molding method. In addition, FIGS. 1B to 1D are process views showing the example of the sheet press molding method of the related art.

DESCRIPTION OF EMBODIMENTS

Hereinafter, the sheet press molding method and the method of manufacturing a fuel cell separator according to the invention will be described in detail with reference to the drawings.

Figure 1:
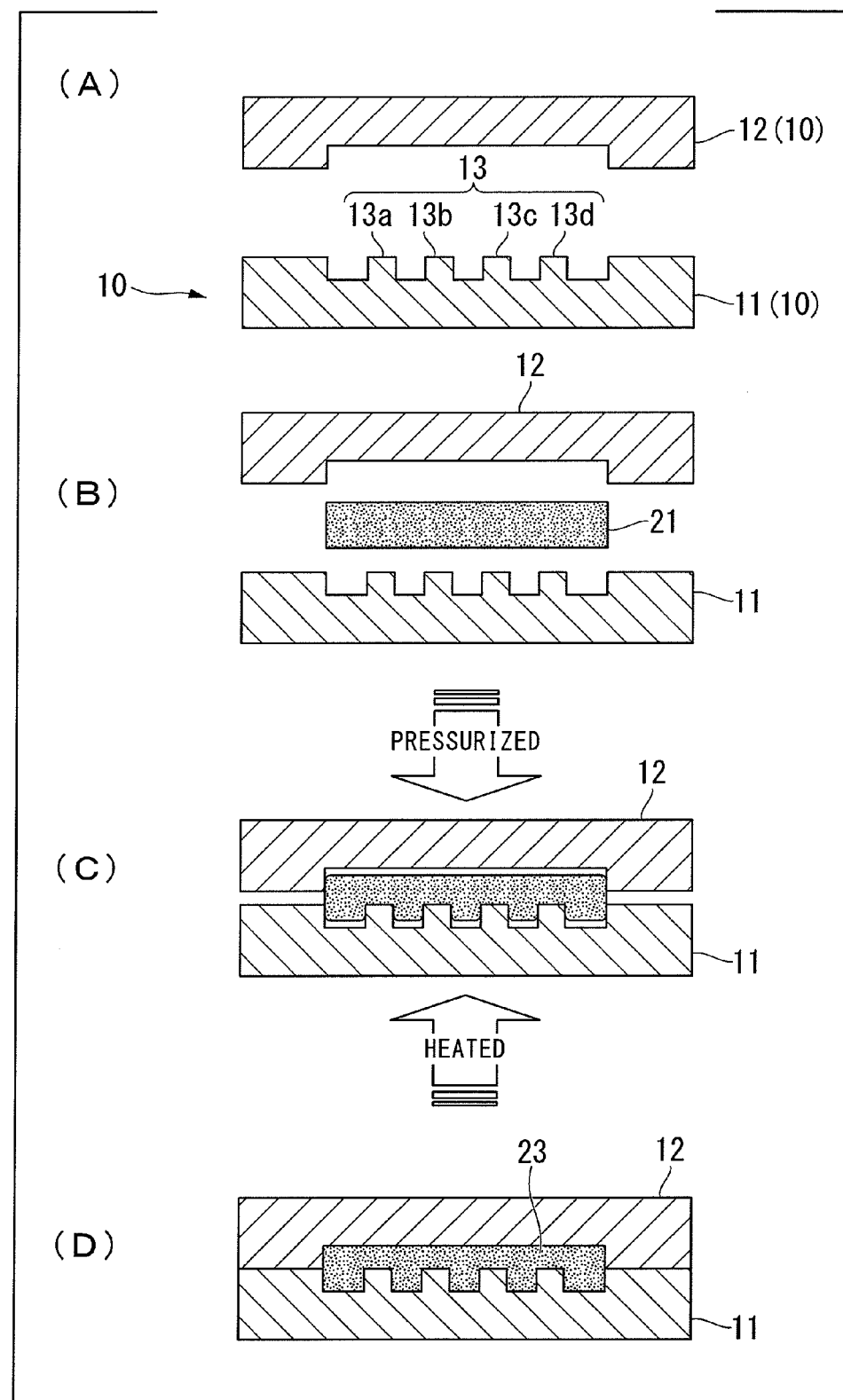
FIG. 1 is a group of diagrams for explaining an example of the sheet press molding method of the related art in which a sheet-shaped material is used.

Here, a sheet press molding method of the related art in which a molded product is formed by press molding of a sheet-shaped material including a filler and a resin composition will be described using the drawings in order to easily describe the invention. FIG. 1 is a group of diagrams for explaining an example of the sheet press molding method of the related art in which a sheet-shaped material is used, and FIG. 1A is a cross-sectional view showing an example of a mold used in the sheet press molding method. In addition, FIGS. 1B to 1D are process views showing the example of the sheet press molding method of the related art.

A mold 10 is composed of a bottom mold 11 and a top mold 12 as shown in FIG. 1A. The bottom mold 11 has a predetermined recess and protrusion pattern 13 composed of a plurality of protruding portions 13a, 13b, 13c, and 13d (4 protruding portions in the example shown in FIG. 1A).

To form a molded product using the mold 10 shown in FIG. 1A, firstly, a sheet-shaped material 21 including a filler and a resin composition is disposed between the bottom mold 11 and the top mold 12 as shown in FIG. 1B. Next, a pressing process is performed in which the bottom mold 11, the top mold 12, and the sheet-shaped material 21 are heated to a temperature at which the sheet-shaped material 21 can be softened and deformed, the sheet-shaped material 21 is compressed by pressurizing the bottom mold 11 and the top mold 12, and maintained for a predetermined time as shown in FIG. 1C. Thereby, the sheet-shaped material 21 is molded as shown in FIG. 1D, and a molded product 23 to which a recess and protrusion pattern 13 is transferred is formed.

Here, the present inventors prepared sheet-shaped materials 21 for which only the content of the filler included in the sheet-shaped material 21 was variously altered, molded the respective sheet-shaped materials 21 under the same conditions using the same mold 10, and investigated the relationship between the content of the filler in the sheet-shaped material 21 and the plate thickness deviation of the molded product 23.

As a result, it was found that molded products 23 having a substantially uniform thickness can be obtained when the sheet-shaped materials 21, for which the content of the filler is small and the content of the resin composition is relatively large, are press-molded, but the plate thickness deviation of the obtained molded products 23 is large when the sheet-shaped materials 21 having a large content of the filler are press-molded.

The inventors repeated studies regarding the causes of such results as follows. That is, the fluidity of the sheet-shaped material 21 having a relatively large content of the resin composition is favorable when softened by performing the pressing process. Therefore, the excessive sheet-shaped material softened by performing the pressing process is smoothly pressed out in the circumferential (x-y (planar surface)) direction. It is presumed that this fact allows the molded product 21 having a substantially uniform thickness to be obtained.

In contrast to the above, the excessive sheet-shaped material 21 having a large content of the filler seldom flows even when the pressing process is performed. Therefore, the sheet-shaped material softened by performing the pressing process is not pressed out in the circumferential (x-y (planar surface)) direction, remains at the current place, and is compressively deformed mainly in the thickness (z) direction. As a result, it is presumed that the plate thickness deviation of the molded product 23 becomes large.

In addition, the inventors repeated studies regarding the plate thickness distribution of the molded products 23. As a result, it was found that the plate thickness becomes thick in the central portion of the molded product 23 and the plate thickness becomes thin in the outer circumferential portion of the molded product 23 when the sheet-shaped material 21 having a large content of the filler is used. Furthermore, it was found that such a tendency of the plate thickness distribution of the molded products 23 becomes more noticeable as the content of the filler included in the sheet-shaped material 21 increases, and the recess and protrusion pattern 13 transferred to the molded product 23 is more refined.

It is presumed that such a tendency of the plate thickness distribution of the molded products 23 results from the fact that the plate thickness becomes thick in the central portion of the molded product 23 since the sheet-shaped material softened by performing the pressing process cannot readily flow out, and the plate thickness becomes thin in the outer circumferential portion of the molded product 23 since the softened sheet-shaped material can readily flow out.

Furthermore, the inventors repeated thorough studies based on the above findings, and obtained ideas regarding the sheet press molding method of the invention and the method of manufacturing a fuel cell separator of the invention in which a mold provided with a dummy pattern composed of dummy recessed portions and dummy protruding portions that offset the difference between the total volume of the protruding portions formed on the inside and the total volume of the recessed portions disposed between the protruding portions and the side surfaces of the inside and between the protruding portions on the inside is used when performing press molding of a molded product having a recess and protrusion pattern portion, and the volume of the protruding portions in the molded product is made to be the same as the volume of the recessed portions in the molded product so that the softened sheet-shaped material pressurized on the protruding portions of the mold and pressed out is smoothly flowed into portions facing the recessed portions of the mold when the pressing process is performed, and the plate thickness deviation of the molded product can be decreased even when the sheet-shaped material is a material having a large amount of a filler which seldom flows even when the pressing process is performed.

In more detail, in a case in which the above mold having the dummy pattern is used when performing press molding of a molded product having a recess and protruding portion, since the difference between the total volume of the protruding portions inside the mold and the total volume of the recessed portions disposed between the protruding portions and the side surfaces of the inside and between the protruding portions is offset by the dummy pattern, and the total volume of the protruding portions and the total volume of the recessed portions become the same on the inside of the mold, the softened sheet-shaped material corresponding to the volume of the protruding portions of the mold is pressed out into the peripheries of the protruding portions of the mold by performing the pressing process, but exactly the same volume of the softened sheet-shaped material as the pressed-out volume is flowed into the recessed portions of the mold. Since the softened sheet-shaped material is smoothly flowed by the above fact, the plate thickness deviation of the molded product is decreased.

In contrast to the above, in a case in which a mold, for example, in which the total volume of the protruding portions and the total volume of the recessed portions disposed between the protruding portions and the side surfaces of the inside and between the protruding portions are different on the inside of the mold, and the dummy pattern is not provided, is used when performing press molding of a molded product having a recess and protrusion pattern, since the amount of the softened sheet-shaped material pressed out into the peripheries of the protruding portions of the mold by performing the pressing process and the amount of the softened sheet-shaped material flowed into the recessed portions of the mold are not uniform, the softened sheet-shaped material pressed out into the peripheries of the protruding portions becomes excessive or insufficient. Therefore, the softened sheet-shaped material does not flow smoothly, and the plate thickness deviation of the molded products is increased.

Figure 2A:
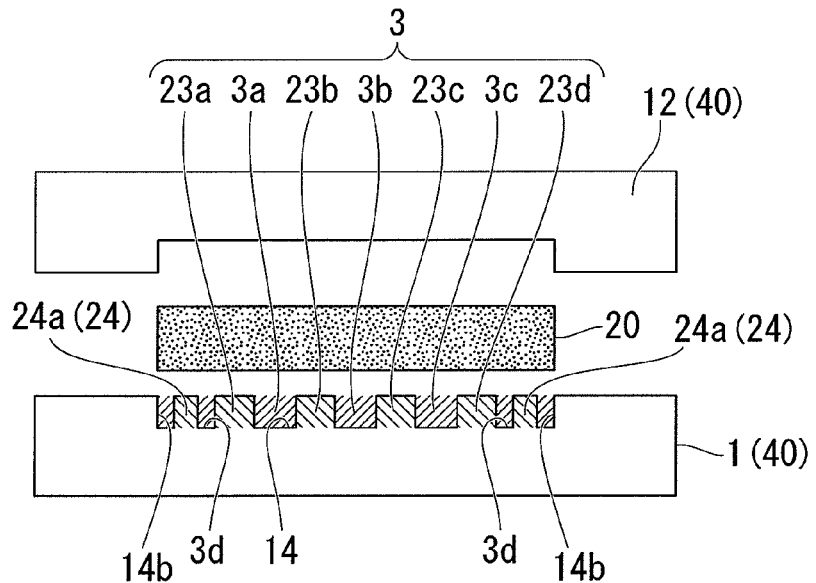
FIG. 2A is a process view for explaining an example of the sheet press molding method of the invention and the method of manufacturing a fuel cell separator of the invention.
Figure 2B:
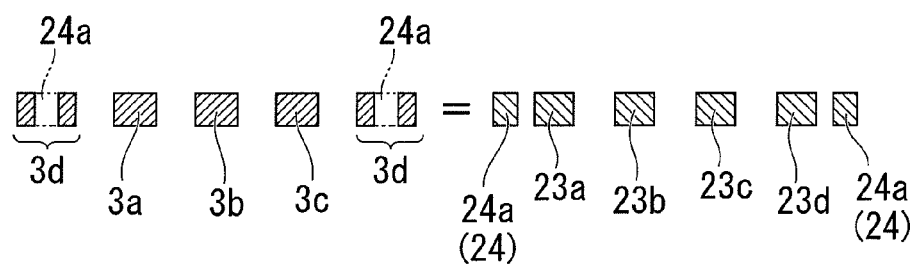
FIG. 2B is a process view for explaining the example of the sheet press molding method of the invention and the method of manufacturing a fuel cell separator of the invention.
Figure 2C:
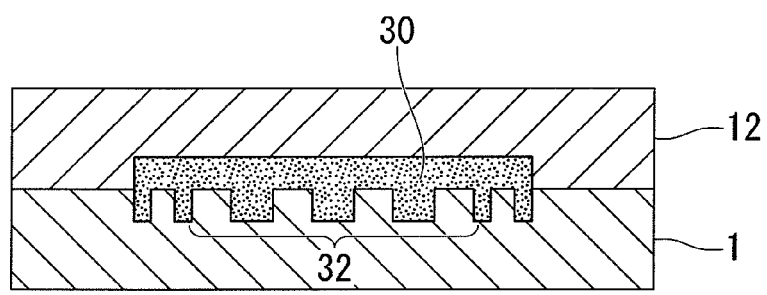
FIG. 2C is a process view for explaining the example of the sheet press molding method of the invention and the method of manufacturing a fuel cell separator of the invention.

Here, the method of manufacturing a fuel cell separator of the invention in which the sheet press molding method of the invention is used will be described using the drawings. FIGS. 2A to 2C are process views for explaining an example of the sheet press molding method of the invention and the method of manufacturing a fuel cell separator of the invention.

The sheet press molding method of the invention is a sheet press molding method for forming a molded product 30 having a recess and protrusion pattern portion 32 configured by transferring a recess and protrusion pattern 3 as shown in FIG. 2C by pressurizing a sheet-shaped material 20 using a pair of molds 40 composed of the top mold 12 and a bottom mold 1 having a predetermined recess and protrusion pattern 3 as shown in FIG. 2A.

The sheet-shaped material 20 includes 60 vol. % to 95 vol. % of a filler and a resin composition. The filler can be appropriately selected according to the use or the like of the molded product 30, and is not particularly limited. Examples of the filler include inorganic fine particles, such as silica, alumina, and titanium oxide, organic fine particles, such as polyethylene and polystyrene, as well as fibrous substances, carbonaceous materials, and the like. Meanwhile, a carbonaceous material is preferably used as the filler when a fuel cell separator is manufactured as the molded product 30 using the sheet press molding method of the invention.

In addition, examples of the resin composition composing the sheet-shaped material 20 include thermosetting resins, thermoplastic resins, and the like.

The content of the filler included in the sheet-shaped material 20 is set to 60 vol. % to 95 vol. %. The specific gravity varies with the type of the filler, and the content of the filler of 60 vol. % to 95 vol. % is equivalent to a content of 80 mass % to 98 mass % when a carbonaceous material is used as the filler. In addition, when the filler is a carbonaceous material, such as a case in which a fuel cell separator is manufactured as the molded product 30, the content of the filler is preferably 85 mass % to 98 mass %. Meanwhile, the content (vol. %) of the filler is computed from the specific gravities of the resin composition and the filler.

The sheet press molding method of the invention can be used even when the content of the filler is below the above range, but the effect of applying the invention is small and ineffective when the content of the filler is small. In addition, in a case in which a fuel cell separator is manufactured as the molded product 30, and the filler is a carbonaceous material, the electrical conductivity of the molded product 30 becomes insufficient when the content of the filler is below the above range. In addition, the fluidity of the sheet-shaped material softened by performing the pressing process is degraded when the content of the filler exceeds the above range, and therefore the molded products 30 having a sufficiently small plate thickness deviation cannot be obtained.

In addition, in a case in which a fuel cell separator is manufactured as the molded product 30, the invention is preferred when a fuel cell separator having a thickness of 2 mm or smaller is manufactured as the molded product 30. When the thickness of a fuel cell separator is 2 mm or smaller, the fuel cell separator has a sufficiently thin thickness.

In addition, the sheet-shaped material 20 preferably has a uniform thickness. The sheet-shaped material 20 having a uniform thickness can be formed by a method or the like in which, for example, the components of the sheet-shaped material including 60 vol. % to 95 vol. % of a filler and a resin composition are uniformly mixed using a kneading machine, which is ordinarily used in the resin field, such as a roll mill, an extrusion machine, a kneader, or a Banbury mixer, and the sheet-shaped material is then formed using a mill roll. Meanwhile, the components of the sheet-shaped material including a filler and a resin composition can be crushed or granulated after the mixing for the purpose of ease of supply of the material to a molding machine. A homogenizer, a Wiley pulverizer, high speed rotation crushers (a hammer mill, a pin mill, a cage mill, and a blender), and the like can be used for crushing, and it is preferable to perform crushing in conjunction with cooling in order to prevent agglomeration of the material. A method of pelletizing the material using an extrusion machine, a ruder, a ko-kneader, and the like, a method in which a pan-type granulator is used, and the like can be used for granulating.

The mold 40 shown in FIG. 2A is composed of the bottom mold 1 and the top mold 12. The recess and protrusion pattern 3 and the dummy pattern 24 are provided on the inside 14 of the bottom mold 1.

Meanwhile, in the invention, the inside 14 of the mold 40 refers to the entire inside in which the sheet-shaped material 20 is accommodated during press molding, which includes not only the inside of the bottom mold 1 but also the inside of the top mold 12. Therefore, FIG. 2A describes a case in which both the recess and protrusion pattern 3 and the dummy pattern 24 are provided in the bottom mold, one of a pair of the molds 40, as an example, but providing the recess and protrusion pattern in one of a pair of the molds and providing the dummy pattern in the other mold is also acceptable.

Figure 2D:
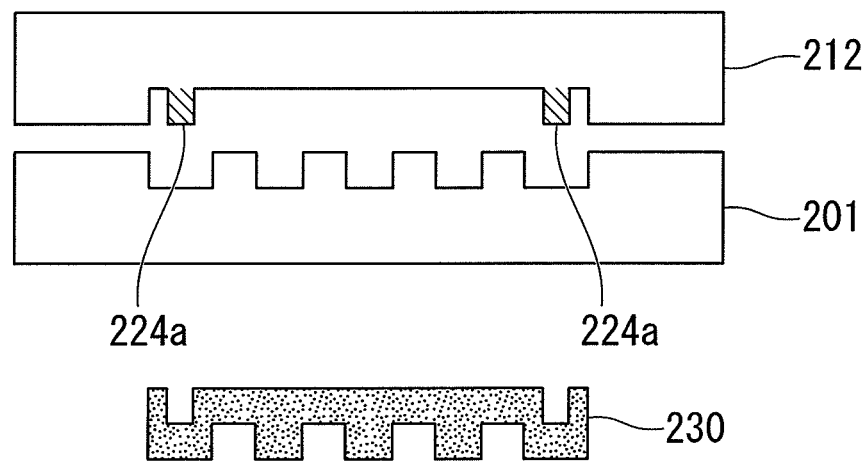
FIG. 2D is a schematic view for explaining the example of the sheet press molding method of the invention and the method of manufacturing a fuel cell separator of the invention.

For example, dummy protruding portions 224*a* are provided only in a top mold 212 in the modified example shown in FIG. 2D. When press molding is performed using the top mold 212 and a bottom mold 201 of the modified example, the obtained molded product 230 will have a cross-sectional shape shown in FIG. 2D.

In addition, the recess and protrusion pattern and the dummy pattern are provided only in the bottom mold in FIG. 2A, but the recess and protrusion pattern and the dummy pattern may be provided in both of the molds. Furthermore, the number of the recess and protrusion pattern and the dummy pattern provided in a pair of the molds is not particularly limited, and may be singular or plural, respectively. In addition, the number of the recess and protrusion pattern and the dummy pattern may be the same or different. Meanwhile, when a plurality of recess and protrusion patterns is formed on the inside of a pair of the molds, all of a plurality of the recess and protrusion patterns may be the same, or some or all may be different.

The recess and protrusion pattern 3 can be determined according to the use or the like of the molded product 30 and is not particularly limited, and, in the embodiment, the recess and protrusion pattern is composed of a plurality of protruding portions 23*a*, 23*b*, 23*c*, and 23*d* disposed at the same intervals in a stripe shape when viewed from the top, each of which has a rectangular cross-sectional shape, and recessed portions 3*a*, 3*b*, and 3*c* disposed between the protruding portions 23*a*, 23*b*, 23*c*, and 23*d* as shown in FIG. 2A. The protruding portions 23*a*, 23*b*, 23*c*, and 23*d* have the same cross-sectional shape in the embodiment, but the shape of the protruding portions may be different from each other. Meanwhile, when a fuel cell separator is manufactured as the molded product 30, the shape of the recess and protrusion pattern 3 is made to match the shape of flow channel recessed portions (grooves) in the fuel cell separator, and a recess and protrusion pattern 32 in the molded product 30 becomes a flow channel pattern.

The dummy pattern 24 is to offset the difference between the total volume of the protruding portions 23*a*, 23*b*, 23*c*, and 23*d* and the total volume of the recessed portions formed on the inside 14 of the molds 40. In the embodiment, the total volume of the protruding portions excluding the dummy pattern 24 refers to the total volume of the protruding portions 23*a*, 23*b*, 23*c*, and 23*d* protruding from the bottom portion of the bottom mold 1 as shown in FIG. 2A. In addition, in the embodiment, the total volume of the recessed portions excluding the dummy pattern 24 refers to the volume of a space between the imaginary surface along the top surface of the bottom mold 1 and the bottom mold 1, which is the total volume of the inside volume of the recessed portions 3*a*, 3*b*, and 3*c* disposed between the protruding portions 23*a*, 23*b*, 23*c*, and 23*d* and the inside volume of the recessed portions 3*d* disposed between the protruding portions 23*a*, 23*b*, 23*c*, and 23*d* and the side surfaces 14*b* of the inside 14. Therefore, in the embodiment, the total volume of the protruding portions is smaller than the total volume of the recessed portions when the dummy pattern 24 is excluded as shown in FIG. 2A.

In the embodiment, dummy protruding portions 24*a* and 24*a* having the same height as the protruding portions 23*a*, 23*b*, 23*c*, and 23*d* and a rectangular cross-sectional shape are provided in parallel in a stripe shape when viewed from the top between the protruding portions 23*a*, 23*b*, 23*c*, and 23*d* and the side surface 14*b* of the inside 14 as the dummy pattern 24 so as to pinch the recess and protrusion pattern 3. Therefore, when the dummy pattern 24 is included, the volume of the recessed portions 3*d* disposed between the protruding portions 23*a*, 23*b*, 23*c*, and 23*d* and the side surfaces 14*b* of the inside 14 is reduced by the volume of the dummy protruding portions 24*a* and 24*a* as shown in FIG. 2B, the total volume of the protruding portions is increased by the volume of the dummy protruding portions 24*a* and 24*a*, the difference between the total volume of the protruding portions and the total volume of the recessed portions is offset, and the total volume of the protruding portions and the total volume of the recessed portions become substantially the same.

Meanwhile, since the total volume of the protruding portions is smaller than the total volume of the recessed portions in the embodiment, the dummy protruding portions 24*a* and 24*a* are provided as the dummy pattern 24, but dummy recessed portions are provided as the dummy pattern when the total volume of the protruding portions is larger than the total volume of the recessed portions.

In addition, the shape of the dummy pattern 24 is not particularly limited as long as the dummy pattern has a volume that can offset the difference between the total volume of the protruding portions and the total volume of the recessed portions, but the height of the dummy protruding portions 24*a* and 24*a* is preferably the same height as the protruding portions 23*a*, 23*b*, 23*c*, and 23*d* of the protrusion pattern 3 when the dummy pattern 24 is dummy protruding portions 24*a* and 24*a* as shown in FIG. 2A, and the depth of the dummy recessed portions is preferably the same depth as the recessed portions 3*a*, 3*b*, and 3*c* of the recess and protrusion pattern when the dummy pattern is dummy recessed portions. In this case, variation in the compressive deformation amount of the sheet-shaped material 20 is decreased when press molding is performed in comparison to a case in which the height (depth) of the dummy protruding portions (dummy recessed portions) is different from the height (depth) of the protruding portions (recessed portions) of the recess and protrusion pattern 3, and therefore the plate thickness deviation of the molded product 30 can be still further reduced.

The disposition of the dummy pattern 24 is not particularly limited, but the dummy pattern is preferably provided at a plurality of places. When the dummy pattern 24 is provided at a plurality of areas, variation in the compressive deformation amount of the sheet-shaped material 20 is decreased when a pressing process is performed in comparison to a case in which the dummy pattern is provided at one place, and therefore the plate thickness deviation of the molded product 30 can be still further reduced. Meanwhile, the dummy pattern 24 is provided at two places in parallel so as to pinch the recess and protrusion pattern 3 in the embodiment, but may be provided at one place or three or more places.

In addition, the disposition of the dummy pattern is not limited to the example shown in FIG. 2A, and is preferably determined according to the disposition of the recessed portions and the protruding portions composing the recess and protrusion pattern. When the disposition of the recessed portions and the protruding portions composing the recess and protruding pattern is biased, it is likely that variation in the compressive deformation amount of the sheet-shaped material 20 is increased when a pressing process is performed, and the plate thickness deviation of the molded product 30 becomes large. Therefore, it is preferable to dispose the dummy pattern in the vicinity of areas where the disposition of the recessed portions and the protruding portions composing the recess and protrusion pattern is significantly biased in order to effectively reduce the variation in the compressive deformation amount of the sheet-shaped material 20 when a pressing process is performed. For example, when the dummy protruding portions are provided as the dummy pattern, the dummy protruding portions are preferably disposed in the vicinity of areas where the compressive deformation amount of the sheet-shaped material 20 is small, and when the dummy recessed portions are provided as the dummy pattern, the dummy recessed portions are preferably disposed in the vicinity of areas where the compressive deformation amount of the sheet-shaped material 20 is large. More specifically, it is preferable to dispose a plurality of dummy patterns so as to surround the recess and protrusion patterns 3 in order to effectively make the compressive deformation amount of the sheet-shaped material 20 uniform when a pressing process is performed. Providing the dummy pattern at the outer circumferential portion of the recess and protrusion pattern 3 is preferred since there is no concern of adverse effects on the electrical conductivity of a fuel cell separator or the fluidity of the flow channel pattern when the fuel cell separator is manufactured as the molded product 30. However, when the widths of the recessed portions and the protruding portions composing the recess and protrusion pattern are not uniform, it is preferable to dispose the dummy pattern in the recess and protrusion pattern in order to effectively reduce the variation in the compressive deformation amount of the sheet-shaped material 20 when a pressing process is performed.

Meanwhile, when it is difficult to dispose the dummy pattern in a mold having the recess and protrusion pattern 3 due to limitations regarding the mold design or the like, the dummy pattern may be disposed on the inside of a separate mold facing the recess and protrusion pattern 3 (the top mold 12 in the example shown in FIG. 2A). The planar disposition of the dummy pattern in this case preferably has a plurality of dummy patterns so as to surround the recess and protrusion pattern 3, similarly to the case in which the dummy pattern is provided in a mold having the recess and protrusion pattern 3. In addition, even when the dummy pattern is provided in a separate mold facing the recess and protrusion pattern 3, it is preferable to dispose the dummy pattern in the recess and protrusion pattern when the widths of the recessed portions and the protrusion portions composing the recess and protrusion pattern are not uniform.

In addition, the dummy pattern 24 may be provided on the outside of the recess and protrusion pattern 3 as shown in FIG. 2A, or may be provided on the inside of the recess and protrusion pattern 3 as long as there is no adverse effect on the molded product 30.

In addition, the dummy pattern 24 is preferably provided at locations corresponding to areas that become the gas supply holes of a fuel cell separator when the fuel cell separator is manufactured as the molded product 30. In this case, a pattern formed by transferring the dummy pattern 24 to the molded product 30 can be used as a guide or the like when the gas supply holes are formed in the fuel cell separator. This case is preferable since the gas supply holes can be easily formed. Meanwhile, the gas supply holes of a fuel cell separator are formed normally by providing holes penetrating the fuel cell separator. Therefore, the pattern formed by transferring the dummy pattern is removed by forming the gas supply holes, but the pattern may be removed after formation of the fuel cell separator.

In addition, when a fuel cell separator is manufactured as the molded product 30, a packing is disposed on the outside edge portion of the flow channel pattern, which is the recess and protrusion pattern portion 32 of the molded product 30, or on the outside edge portion of the manifold hole (gas supply hole) for flowing combustion gas or the like. Therefore, it is preferable to dispose the dummy pattern 24 at locations where the packing is not disposed.

Meanwhile, when the dummy pattern composed of the dummy recessed portions or the dummy protruding portions is disposed along the outside edge portion of the flow channel pattern or the outside edge portion of the manifold hole for flowing combustion gas or the like, it is possible to make the dummy pattern function as a packing after the flow channel pattern is formed, or the manifold hole is formed. In this case, the dummy pattern is used as the packing as well, and is thus provided at a location where the packing is disposed.

Here, the sheet-shaped material 20 used when a fuel cell separator is manufactured as the molded product 30 will be described. The sheet-shaped material 20 used when a fuel cell separator is manufactured as the molded product 30 includes a carbonaceous material (A), which is a filler, and a resin composition (B) as the essential components.

"Carbonaceous Material (A)"

Examples of the carbonaceous material (A) include one or mixtures of two or more selected from carbonaceous materials, such as carbon black, (pitch-based and PAN-based) carbon fibers, amorphous carbon, expanded graphite, kish graphite, artificial graphite, natural graphite, vapor grown carbon fibers, carbon nanotubes, and fullerene. Among them, one or mixtures of two or more selected from (pitch-based and PAN-based) carbon fibers, amorphous carbon, expanded graphite, kish graphite, artificial graphite, natural graphite, vapor grown carbon fibers, carbon nanotubes, and fullerene are preferred since carbon black has a low electrical conductivity and a low packing property in comparison to other materials.

In addition, the carbonaceous material (A) preferably contains boron, and artificial graphite containing boron can be particularly preferably used among them.

(Carbon Black)

Examples of carbon black, which is an example of the carbonaceous material (A), include KETJENBLACK, acetylene black, which are obtained by incomplete combustion of natural gas or the like or thermal decomposition of acetylene, furnace carbon obtained by incomplete combustion of hydrocarbon oil or natural gas, thermal carbon obtained by thermal decomposition of natural gas, or the like.

(Carbon Fibers)

Examples of (pitch-based and PAN-based) carbon fibers, which are an example of the carbonaceous material (A), include pitch-based carbon fibers produced from heavy oil, oil byproducts, coal tar, or the like, PAN-based carbon fibers produced from polyacrylonitrile, or the like.

The average fiber lengths of carbon fibers are obtained by measuring the number average fiber lengths by the image analysis of the lengths of 100 fibers observed using a SEM (manufactured by JEOL Ltd., JSM-5510). Meanwhile, the carbon fibers mentioned herein refer to fibers having a ratio of (the length of the long axis to the length of the short axis) of 10 or larger.

(Amorphous Carbon)

Examples of amorphous carbon, which is an example of the carbonaceous material (A), include amorphous carbon obtained by a method in which a phenol resin is cured, fired, and crushed so as to become powder, or a phenol resin is cured in the state of spherical or irregular-shaped powder and subjected to a firing treatment. It is preferable to perform a heating treatment at 2000° C. or higher in order to obtain highly electrically conductive amorphous carbon.

(Expanded Graphite)

Examples of the expanded graphite, which is an example of the carbonaceous material (A), include powder obtained by immersing graphite having a highly developed crystal structure, such as natural graphite and thermally decomposed graphite, in a strong oxidizing solution of the mixture of strong sulfuric acid and nitric acid or the mixture of strong sulfuric acid and hydrogen peroxide solution so as to generate a graphite intercalation compound, pickling and rapidly heating the compound, and expanding the C-axis direction of the graphite crystals, powder obtained by rolling the above powder once into a sheet shape and crushing the sheet, or the like.

(Kish Graphite)

Examples of kish graphite, which is an example of the carbonaceous material (A), include carbon that is precipitated as the temperature of molten pig iron is decreased by the pig iron preliminary treatment or the like, and is planarly crystallized. Since kish graphite is generated in a state of a mixture with slag or iron oxide, powder obtained by recollecting highly pure kish graphite through concentration, crushing and finishing the kish graphite into a suitable size for use is preferably used.

(Artificial Graphite)

As the artificial graphite which is an example of the carbonaceous material (A), graphite powder or the like obtained by, for example, the method shown below is used, and, generally, coke is manufactured in order to obtain artificial graphite. Petroleum-based pitch, coal-based pitch, and the like is used as a raw material of coke. The raw material is carbonized so as to become coke. Ordinary methods to obtain graphite powder from coke include a method in which coke is crushed, and then a graphitization treatment is performed, a method in which coke itself is graphitized and crushed, a method in which a fired product obtained by molding and firing coke after addition of a binder to the coke (coke and the fired products of coke are collectively referred to as 'coke or the like') is subjected to a graphitization treatment and then crushed so as to become powder, or the like. Since the raw material of coke or the like in which crystals are least developed is preferred, the raw material which has undergone a heating treatment at 2000° C. or lower, and preferably 1200° C. or lower is suitable. In addition, examples of the method of the graphitization treatment that can be used include a method in which an Acheson furnace, in which powder is fed into a graphite crucible, and electricity is directly flowed, is used, a method in which powder is heated using a graphite heating article, or the like.

(Vapor-Grown Carbon Fibers, Carbon Nanotubes)

The carbonaceous material (A) preferably includes 0.1 mass % to 50 mass % of a gas-phase method carbon fiber and/or carbon nanotubes. 0.1 mass % to 45 mass % is more preferable, and 0.2 mass % to 40 mass % is even more preferable.

(Vapor Grown Carbon Fibers)

Examples of the vapor grown carbon fibers include carbon fibers which are obtained by using an organic compound, such as, benzene, toluene, natural gas, and hydrocarbon-based gas, as a raw material, and making the raw material undergo a thermal decomposition reaction with hydrogen gas at 800° C. to 1300° C. in the presence of a transition metal catalyst, such as ferrocene, and have a fiber length of about 0.5 μm to 10 μm and a fiber diameter of 200 nm or smaller. The fiber diameter is more preferably 160 nm or smaller, and even more preferably 120 nm or smaller. When the fiber diameter is larger than 200 nm, the effect for obtaining a high electrical conductivity becomes small, which is not preferable. Furthermore, carbon fibers obtained by the above method are preferably subjected to a graphitization treatment at about 2300° C. to 3200° C. Meanwhile, the graphitization treatment herein is more preferably performed together with a graphitization catalyst, such as boron, boron carbide, beryllium, aluminum, or silicon, in an inert gas atmosphere.

(Carbon Nanotubes)

Carbon nanotubes have been recently drawing industrial attention for the field emission function or the hydrogen absorption function as well as the mechanical strength. Furthermore, the magnetic function has also begun to gain attention. These types of carbon nanotubes are also called graphite whiskers, filamentous carbon, graphite fibers, ultra-fine carbon tubes, carbon tubes, Carbon Fibril, carbon micro tubes, carbon nano fibers, or the like, and the fiber diameter is about 0.5 nm to 100 nm. Carbon nanotubes include single-layer carbon nanotubes, in which the tube-forming graphite membrane is a single layer, and multi-layer carbon nanotubes, in which the graphite membrane is composed of multi layers. Any of the single-layer and multi-layer carbon nanotubes can be used in the invention, but the use of the single-layer carbon nanotubes is preferred since there is a tendency that a composition having a higher electrical conductivity or mechanical strength can be obtained.

Carbon nanotubes are obtained by manufacturing the carbon nanotubes using an arc discharge method, a laser vaporization method, a thermal decomposition method, and the like, which are described in, for example, "Fundamentals of Carbon Nanotubes" by Saito and Bando (pages 23 to 57, published by Corona Publishing Co., Ltd. on 1998), and purifying the carbon nanotubes using a hydrothermal method, a centrifugal method, an ultrafiltration method, an oxidation method, and the like to further increase the purity. It is more preferable to perform a high temperature treatment in an inert gas atmosphere of about 2300° C. to 3200° C. in order to remove impurities. It is even more preferable to perform a high temperature treatment in an inert gas atmosphere at about 2300° C. to 3200° C. together with a graphitization catalyst, such as boron, boron carbide, beryllium, aluminum, and silica.

(Carbonaceous Materials Containing Boron)

The carbonaceous material (A) preferably contains 0.05 mass % to 5 mass % of boron, more preferably 0.06 mass % to 4 mass %, and even more preferably 0.06 mass % to 3 mass %. When the content of boron is less than 0.05 mass %, there is a tendency for the aimed for highly electrically conductive carbonaceous material to be difficult to obtain. In addition, when the content of boron exceeds 5 mass % as well, there is a tendency that contribution to an increase in the electrical conductivity of the carbonaceous material becomes difficult, the amount of impurities increases, and a tendency of other properties degrading is likely to occur.

Methods of measuring the content of boron included in the carbonaceous material are not particularly limited. For example, values measured by the inductively coupled plasma (hereinafter referred to briefly as "ICP") or the inductively coupled plasma-mass spectrometry (hereinafter referred to briefly as "ICP-MS") can be used. Specific examples include a method in which sulfuric acid or nitric acid is added to a carbonaceous material containing boron, which is a test specimen, the mixture is heated to 230° C. by microwaves so as to be thermally decomposed (a digester method), furthermore, the mixture decomposed by adding perchloric acid ($HClO_4$) is diluted by water, and the mixture is set in an ICP apparatus, thereby measuring the amount of boron, or the like.

An example of the method of including boron in the carbonaceous material (A) is a method in which a mixture of one or two or more selected from carbonaceous materials, such as carbon black, carbon fibers, amorphous carbon, expanded graphite, kish graphite, artificial graphite, natural graphite, vapor grown carbon fibers, carbon nanotubes, and fullerene, is mixed with a B elementary substance, which is a boron source, such as $B_4C$, $BN$, $B_2O_3$, and $H_3BO_3$, and a graphitization treatment is performed at about 2300° C. to 3200° C., or the like. When the mixing of the carbonaceous material and the boron source is inhomogeneous, not only does the carbonaceous material containing boron become inhomogeneous, but so does the possibility of being sintered during the graphitization treatment increase. In order to mix the carbonaceous material and the boron source homogeneously, it is preferable to make the boron source into powder having a particle diameter of 50 µm or smaller, preferably about 20 µm or smaller, and then mix the boron source with the above powder of the carbonaceous material.

In addition, the form of containing boron included in the carbonaceous material containing boron is not particularly limited as long as boron and/or a boron compound is present in the carbonaceous material in a mixture form, but a form in which boron and/or a boron compound is present between the layers of graphite crystals, or some of the carbon atoms forming graphite crystals are substituted with boron atoms is more preferred when the carbonaceous material has graphite crystals. In addition, when some of the carbon atoms are substituted with boron atoms, the bonding between the boron atoms and the carbon atoms may be in any bonding form of covalent bonding, ionic bonding, or the like.

(Crushing of Coke and the Like)

Crushers, such as high-speed rotation crushers (a hammer mill, a pin mill, and a cage mill), a variety of ball mills (a tumbling mill, an oscillating mill, and a planetary mill), and stirring mills (a bead mill, an attritor, a flow-tube mill, and an annular mill), can be used for the crushing of coke used for the manufacture of the carbonaceous material or artificial graphite or natural graphite used as the carbonaceous material. In addition, fine crushers, such as a screen mill, a turbo mill, a super micron mill, and a jet mill, can also be used with selected conditions. Coke, natural graphite, and the like are crushed using the above crushers, and, at this time, it is preferable to use the crusher with selected crushing conditions, classified powder based on necessity, and controlled average particle diameter or particle size distribution.

(Classification of Coke or the Like)

As methods for classifying coke powder, artificial graphite powder, natural graphite powder, and the like, any method can be used as long as they can perform separation. For example, a sieving method or air flow classifiers, such as forcible vortex-type centrifugal classifiers (a micron separator, a Turboprex, a turbo classifier, and a super separator), inertial classifiers (an advanced virtual impactor, and an elbow jet) or the like, can be used. In addition, a wet-type sedimentation separating method, a wet-type centrifugal classifying method, and the like can also be used.

"Resin Composition (B)"

Examples of the resin composition (B) include thermosetting resins or thermoplastic resins.

It is preferable to use resins having a melting point or a glass transition temperature of a fuel cell separator of 120° C. or higher from the viewpoint of the durability of the fuel cell separator.

In addition, it is preferable that 2 mass % to 20 mass % of one or more components selected from 1, 2-polybutadiene, 3, 4-polyisoprene, novolac-type epoxy resins, novolac-type phenol resins, polyethylene, polypropylene, polymethylpentene, polystyrene, polyphenylenesulfide, polycycloolefin, polybutene-1, polyphenylene ether, polyether ketone, fluororesins, or liquid crystal polymers is included as the resin composition (B) in a electrically conductive resin composition including the carbonaceous material (A) and the resin composition (B), which is the sheet-shaped material, are desirable to improve the hydrothermal properties of a fuel cell separator, and, particularly, one or more components selected from 1, 2-polybutadiene, 3, 4-polyisoprene, polyethylene, polypropylene, and polybutene-1 are preferably included in the above content.

(Other Additives)

The sheet-shaped material 20 used when the molded product 30 is a fuel cell separator can contain monomers, a reaction initiator, elastomers, rubber, a resin modifier, or the like in addition to the carbonaceous material (A), which is a filler, and the resin composition (B) according to necessity. Furthermore, the sheet-shaped material 20 used when the molded product 30 is a fuel cell separator can contain additives, such as glass fibers, whiskers, metallic oxides, organic fibers, an ultraviolet stabilizer, an oxidation inhibitor, a mold release agent, a lubricant, a hydrophilicity-imparting agent, or the like according to necessity for the purpose of improving hardness, strength, electrical conductivity, moldability, durability, weather resistance, water resistance, and the like.

The sheet press molding method of the embodiment is a method provided with a process in which the molded product 30 having the recess and protrusion pattern portion 32, to which the recess and protrusion pattern 3 is transferred, is formed by pressurizing the sheet-shaped material 20 including 60 vol. % to 95 vol. % of the filler and the resin composition using a pair of the molds 40 having the predetermined recess and protrusion pattern 3 composed of the recessed portions 3a, 3b, and 3c and the protruding portions 23a, 23b, 23c, and 23d in at least one of the pair, in which the mold provided with the dummy pattern 24 composed of the dummy protruding portions 24a that offset the difference between the total volume of the protruding portions 23a, 23b, 23c, and 23d formed on the inside 14 and the total volume of the recessed portions 3a, 3b, and 3c disposed between the protruding portions 23a, 23b, 23c, and 23d and the side surfaces 14b of the inside 14 and between the protruding portions 23a, 23b, 23c, and 23d is used as a pair of the molds 40. Therefore, the volume of the protruding portions of the molded product 30 becomes the same as the volume of the recessed portions of the molded product 30, the softened sheet-shaped material 20 pressurized on the protruding portions of the mold 40 and pressed out when a pressing process is performed is smoothly flowed into portions facing the recessed portions of the mold 40. Therefore, it is possible to reduce the difference of the compressive deformation amount of the sheet-shaped material 20 when a pressing process is performed.

As a result, according to the sheet press molding method of the embodiment, even when the sheet-shaped material 20 including the filler and the resin composition includes a large amount of the filler or the mold 40 has a refined recess and protrusion pattern 3, the molded product 30 having a small plate thickness deviation can be obtained when the molded product 30 is manufactured by press molding of the material.

Since the method of manufacturing a fuel cell separator of the embodiment is a method of manufacturing a fuel cell separator as the molded product 30 using the sheet press molding method of the embodiment that uses the sheet-shaped material 20 including a carbonaceous material as the filler, a fuel cell separator having a small plate thick deviation, a high strength, and a high electrical conductivity can be obtained by using a material including a large amount of the carbonaceous material as the sheet-shaped material 20 including the carbonaceous material and the resin composition, and by performing press molding of the material.

In addition, a fuel cell separator having a small plate thickness deviation and a refined flow channel pattern can be easily obtained by using a refined pattern as the recess and protrusion pattern 3 in the method of manufacturing a fuel cell separator of the embodiment.

In addition, since a fuel cell separator having a flow channel pattern is formed by pressurizing the sheet-shaped material using a pair of molds in the method of manufacturing a fuel cell separator of the embodiment, a fuel cell separator having a thin thickness can be efficiently manufactured, and the method is preferable for mass production.

EXAMPLES

Hereinafter, the invention will be described specifically showing examples.

Example

The fuel cell separator of the embodiment was manufactured as a molded product using a sheet-shaped material including a carbonaceous material as the filler and the sheet press molding method of the invention.

Figure 3A:
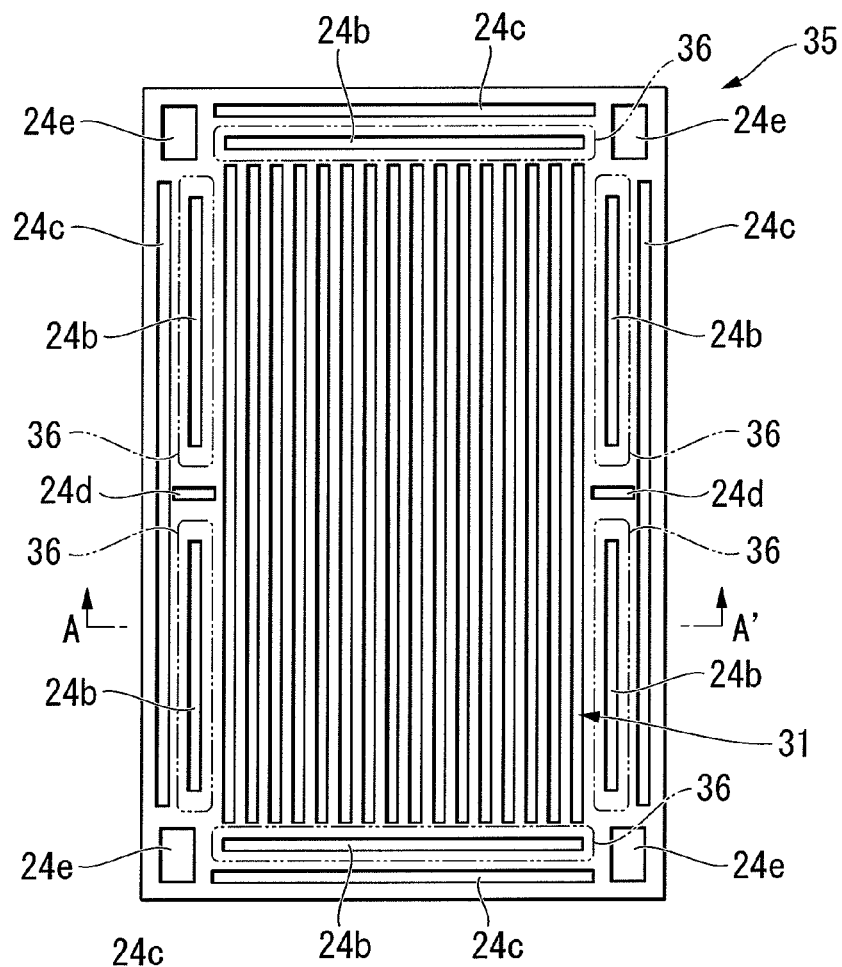
FIG. 3A is a planar view of the fuel cell separator of the example.
Figure 3B:
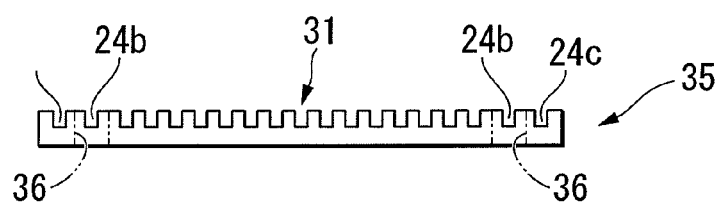
FIG. 3B is a cross-sectional view of the cross-section A-A' in FIG. 3A.
Figure 3C:
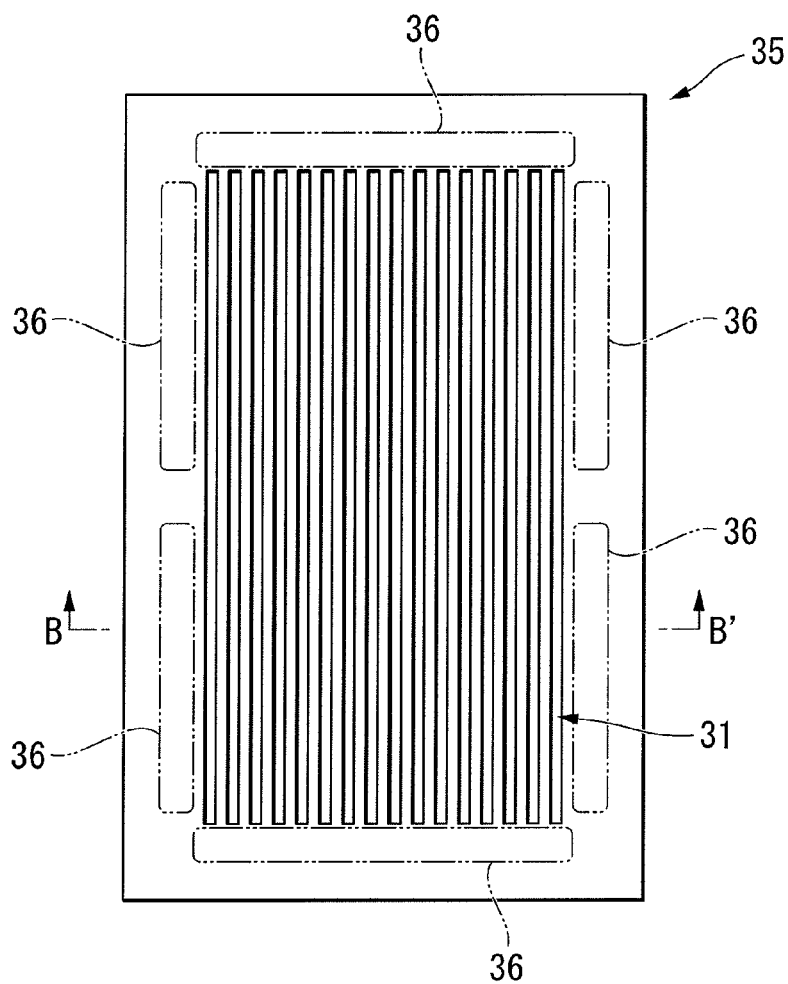
FIG. 3C is a planar view of the fuel cell separator of a comparative Example.
Figure 3D:
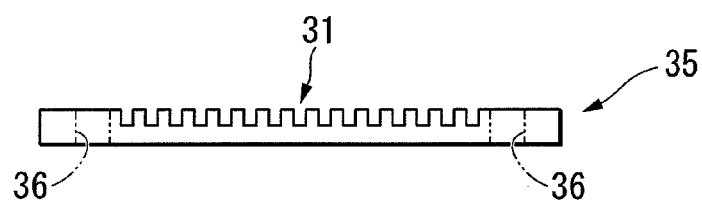
FIG. 3D is a cross-sectional view of the cross-section B-B' in FIG. 3C.

That is, a fuel cell separator 35 shown in FIG. 3 having a flow channel pattern 31 to which a recess and protrusion pattern is transferred and a plurality of recessed portions 24b, 24c, 24d, and 24e to which a dummy pattern is transferred on one surface is obtained by pressurizing the sheet-shaped material shown below using the pair of molds shown below having the recess and protrusion pattern. FIGS. 3A to 3D are views showing the fuel cell separators of Example and Comparative Example. FIG. 3A is a planar view of the fuel cell separator of Example, FIG. 3B is a cross-sectional view of the cross-section A-A' in FIG. 3A. In addition, FIG. 3C is a planar view of the fuel cell separator of Comparative Example, and FIG. 3D is a cross-sectional view of the cross-section B-B' in FIG. 3C.

"Mold"

Here, the internal shape of the bottom mold used when the fuel cell separator of Example is press-molded will be described using FIGS. 3A and 3B.

A pair of top and bottom molds provided with a recess and protrusion pattern composed of recessed portions and protruding portions, which will be described below, and the dummy pattern composed of dummy protruding portions, which will be described below, on the inside of the bottom mold was used as a mold in the example. Meanwhile, in the mold used in the example, the total volume of the protruding portions formed on the inside is smaller than the total volume of the recessed portions when the dummy pattern is not included, but the difference between the total volume of the protruding portions formed on the inside and the total volume of the recessed portions is offset, and the two total volumes thus become the same when the dummy pattern is included.

Recess and protrusion pattern (corresponding to the flow channel pattern 31 in FIGS. 3A and 3B): protruding portions (grooves in the fuel cell separator) having a trapezoid cross-sectional form with a thickness of 0.5 mm, a width bottom side (bottom portion width) of 2.1 mm, a width top side (top portion width) of 1.9 mm, and an average width of 2 mm were disposed in a stripe shape in an area having a length of 160 mm and a width of 62 mm at a pitch of 4 mm (the intervals between the width top sides was 2 mm) so that the length direction became the length direction of the protruding portions (grooves).

Dummy pattern: Dummy protruding portions having a height (depth) of 0.5 mm (corresponding to the recessed portions 24b, 24c, 24d, and 24e in FIGS. 3A and 3B) were provided at the outer circumferential portion of the flow channel pattern 31 so as to surround the flow channel pattern 31 twice. Meanwhile, the area of each of the dummy protruding portions was adjusted so that the total volume of the protruding portions formed on the inside of the bottom mold and the total volume of the recessed portions became the same.

The dummy protruding portions on the inside (corresponding to the recessed portions 24b in FIGS. 3A and 3B) were separated from each other and disposed at 6 places that correspond to the areas 36 that become gas supply holes of the fuel cell separator with such a width that could avoid locations, on which packing would be disposed, so that the recessed portions 24b of the fuel cell separator 35 could be used as a guide when the gas supply holes were formed in the fuel cell separator. In addition, the dummy protruding portions on the outside (corresponding to the recessed portions 24c in FIGS. 3A and 3B) were disposed at 4 places on the outside of the dummy protruding portions on the inside, avoiding the location where packing is disposed. In addition, the dummy protruding portions (corresponding to the recessed portions 24d in FIG. 3A) were provided at 2 places in the central portion of the fuel cell separator 35, which are areas where the dummy protruding portions on the inside were not disposed, in the outer circumferential portions of the flow channel pattern 31. Furthermore, the dummy protruding portion (corresponding to the recessed portion 24e in FIG. 3A) was provided at each of the 4 corner portions of the fuel cell separator 35.

"Sheet-shaped material"

(Manufacture of a Carbonaceous Material)

Firstly, non-needle coke (MC coke, manufactured by MC Carbon Co., Ltd.) was coarse-crushed into a size of 3 mm or smaller using a pulverizer (manufactured by Hosokawa Micron Group). Next, this coarse-crushed product was fine-crushed using a jet mill (IDS2UR, manufactured by Nippon Pneumatic Mfg. Co., Ltd.) and classified, thereby adjusting the particle diameter. Particles of 5 μm or smaller were removed by air flow classification using a turbo classifier (TC15N, manufactured by Nisshin Engineering Inc.) during the classification. Next, 0.15 kg of boron carbide ($B_4C$) was added to 14.85 kg of the fine-crushed product whose particle diameter was adjusted and the two were mixed for 5 minutes using a Henschel mixer at a rotation speed of 800 rpm. Subsequently, 1 kg of the obtained mixture was enclosed in a graphite crucible with a lid having a capacity of 1.5 liters, and put into a graphite furnace that uses a graphite heater, the inside of the graphite furnace was firstly made into a vacuum and then substituted with argon gas, the mixture was graphitized at an internal pressure of 1.2 atm and a temperature of 2800° C. under a gas flow in an argon gas atmosphere, and was cooled in the argon gas atmosphere. 0.49 kg of artificial graphite fine powder was obtained in such a manner. Meanwhile, the average particle diameter of the obtained artificial graphite fine powder was 20 μm.

In addition, natural graphite having an average particle diameter of 18 μm, which was made in China, (BTRSG18, manufactured by BTR Energy Materials Co., Ltd.) was mixed with boron carbide in the same manner as the case in which the above fine-crushed product having the adjusted particle diameter was used, thereby obtaining boron-containing natural graphite. Meanwhile, the average particle diameter of the obtained boron-containing natural graphite was 25 μm.

The same amounts of the artificial graphite powder and the boron-containing natural graphite obtained in the above manner were mixed so as to produce a carbonaceous material.

Meanwhile, the average particle diameters of the artificial graphite powder and the boron-containing natural graphite were measured by the method shown below.

Firstly, 50 mg of a sample was weighed and added to 50 ml of distilled water. Furthermore, 0.2 ml of 2% Triton (a surfactant, manufactured by Wako Pure Chemical Industries, Ltd.) aqueous solution was added, the mixture was ultrasonic-dispersed for 3 minutes, and the number average particle diameter was measured using a laser diffraction scattering method (a Microtrack HRA apparatus, manufactured by Nikkiso Co., Ltd.).

(Manufacture of a Sheet-Shaped Material)

The carbonaceous material obtained in the above manner, the resin compositions shown in Table 1, and the reaction initiator shown in Table 1 were kneaded for 5 minutes at a temperature of 100° C. and a rotation speed of 40 rpm using a Laboplastomill (manufactured by Toyo Seiki Co., Ltd.), thereby obtaining a mix including components that compose a sheet-shaped material. The mix was crushed using a Wiley pulverizer (manufactured by Yoshida Seisakusho Co., Ltd.) so as to become powder having a sub sieve of 2 mm or smaller. The powder was heated in an oven up to 90° C., and was supplied to a 10-inch mill roll (manufactured by Daihan Co., Ltd.) having a roll surface temperature of 30° C. so as to become a sheet, thereby obtaining a sheet-shaped material having a length of 200 mm, a width of 100 mm, and a thickness of 0.9 mm.

The content of the carbonaceous material in the obtained sheet-shaped material was 85 mass %, the content of boron in the carbonaceous material was 2 mass %, and the density was 1.5 g/cm³. Meanwhile, the content of boron was measured using the method described in [0058]. In addition, with regard to the density of boron, the specific gravity measured based on the water displacement method (Archimedes method) defined in the act A of JIS K7112 was employed as the density.

TABLE 1

| | | Composition ratio (mass %) |
|---|---|---|
| Resin composition | 1,2-polybutadiene*1 | 7.1 |
| | 1,2-polybutadiene*2 | 3.55 |
| | Low-density polyethylene*3 | 3.55 |

TABLE 1-continued

| | | Composition ratio (mass %) |
|---|---|---|
| Carbonaceous material | Artificial graphite/natural graphite = 1/1 | 85.1 |
| Reaction initiator | 2,5-dimethyl 2, 5-di(t-butylperoxy) hexane*4 | 0.7 |

*1NISSO-PB B3000 manufactured by Nippon Soda Co., Ltd.
*2JSR RB-810, manufactured by JSR
*3Novatech ® LD LJ802, manufactured by Japan Polyethylene Corporation
*4Kayahexa AD, manufactured by Kayaku Akzo Corporation "Pressing Conditions"

The load, temperature, and curing time were set to 250 t, 180° C., and 2.5 minutes, respectively.

Figure 4:
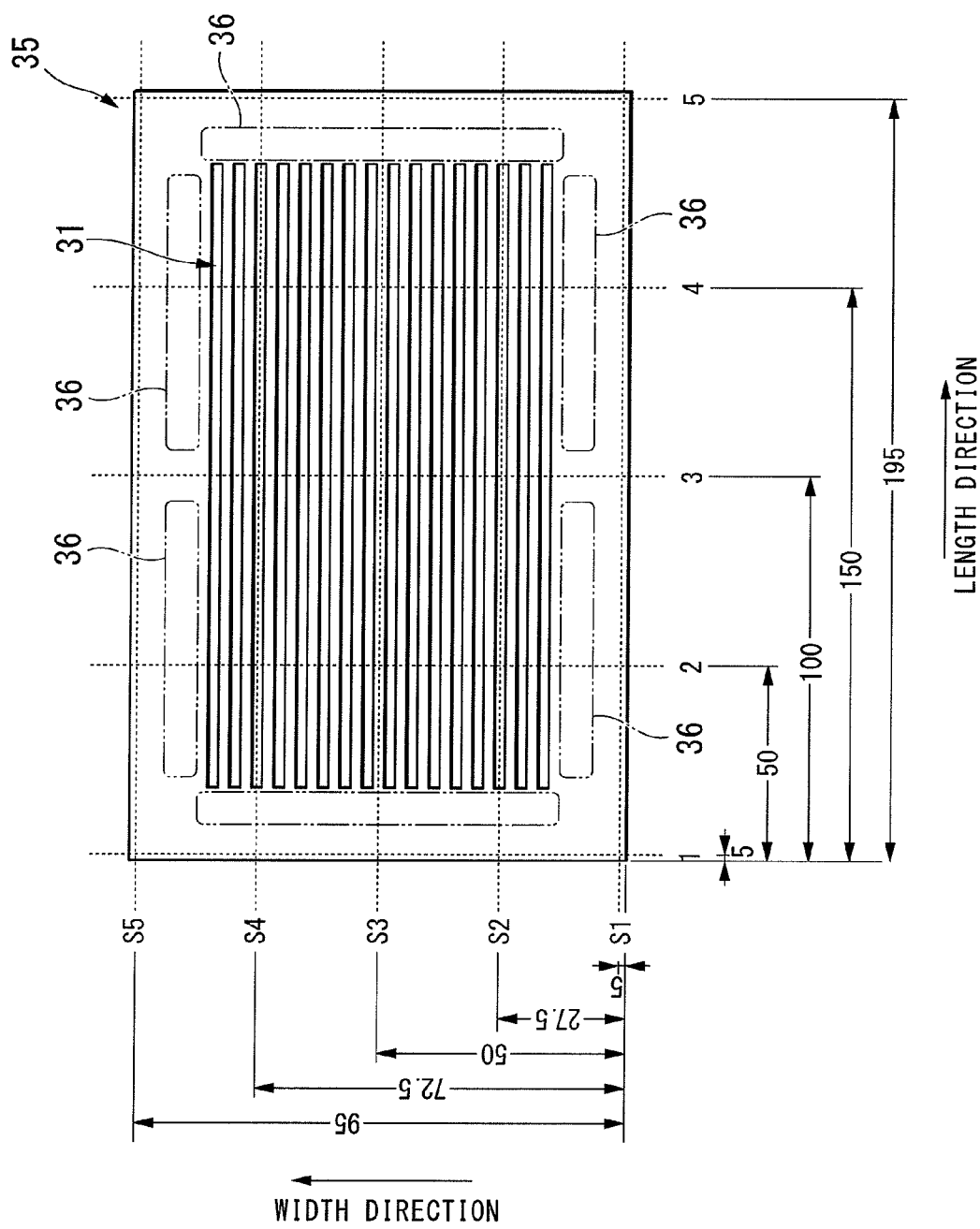
FIG. 4 is a planar view showing the fuel cell separator of the example.
Figure 5A:
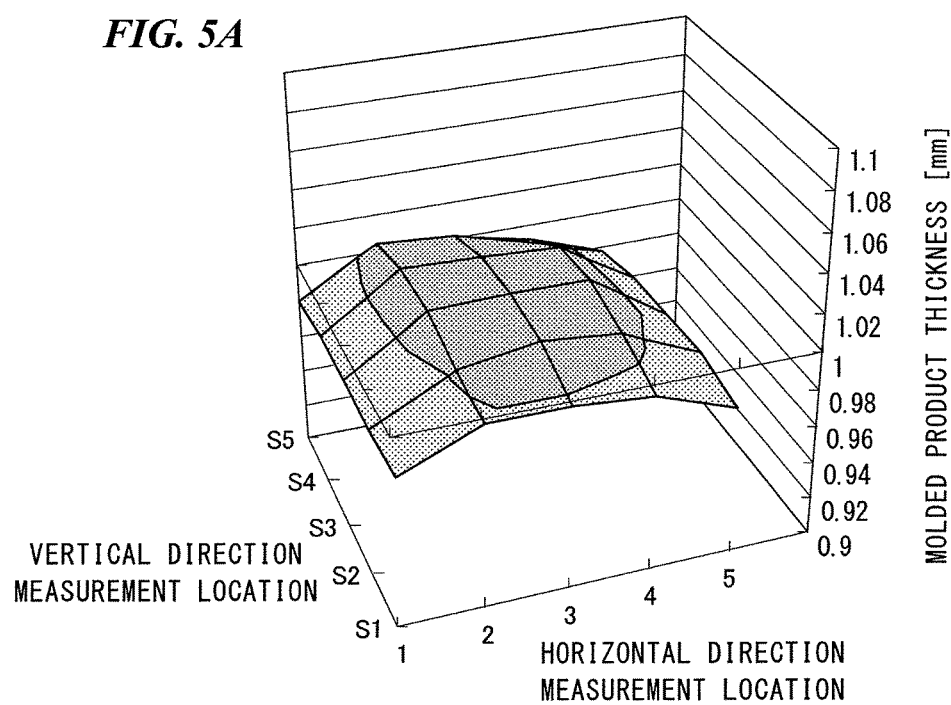
FIG. 5A is a graph showing the evaluation results of the plate thickness deviation of the fuel cell separator of the example.

The thickness of the fuel cell separator 35 of the example obtained in the above manner was measured at a plurality of locations using a micrometer, and the plate thickness deviation was evaluated. Meanwhile, the measurement locations of the thickness of the fuel cell separator 35 were determined by substantially equally dividing the area inside the margin areas provided along the outside edge with a width of 5 mm into 4 parts in the length direction and the width direction, respectively, by the dimension shown in FIG. 4 (the unit of the dimension shown in FIG. 4 is 'mm'), and setting the intersectional locations between dotted lines shown by reference numbers 1 to 5 in FIG. 4, which are the dividing lines in the length direction and the inside border lines of the margin areas, and dotted lines shown by reference numbers S1 to S5 in FIG. 4, which are the dividing lines in the width direction and the inside border lines of the margin areas. In addition, the recessed portions 24b, 24c, 24d, and 24e were not marked in FIG. 4 to make the drawing easier to view. The results are shown in FIG. 5A and Table 2. FIG. 5A is a graph showing the evaluation results of the plate thickness deviation of the fuel cell separator of the example.

TABLE 2

| Maximum value | 1.012 (mm) |
|---|---|
| Minimum value | 0.980 (mm) |
| Average | 0.996 (mm) |
| Maximum − Minimum | 0.032 (mm) |
| Standard deviation | 0.013 (mm) |

Comparative Example

The fuel cell separator of the comparative example shown in FIGS. 3C and 3D was formed in the same manner as the example except that the mold which is similar, but provided with no dummy pattern was used.

Figure 5B:
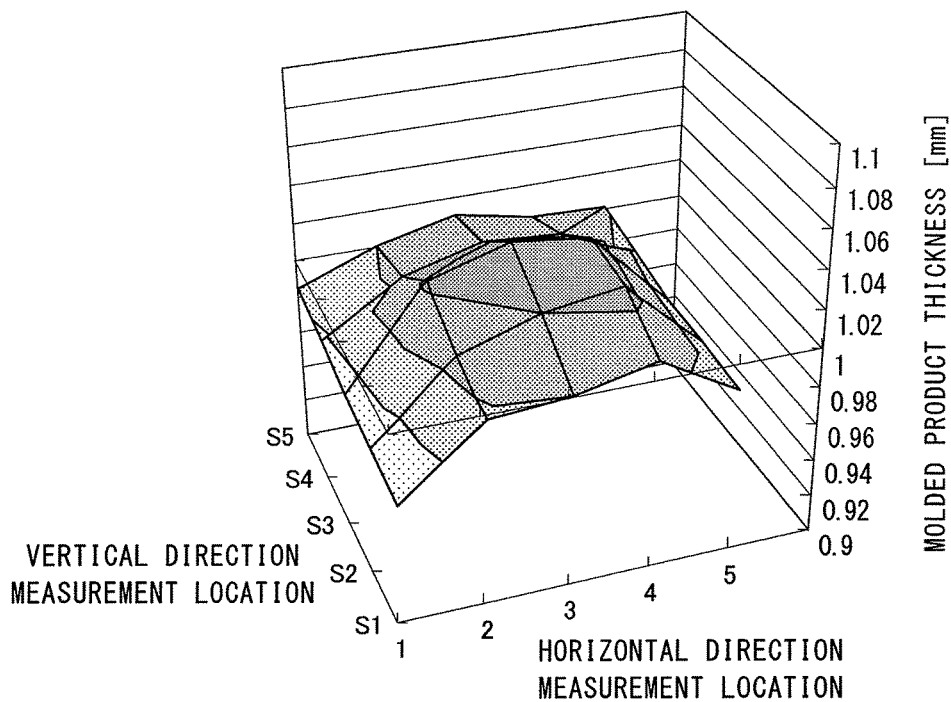
FIG. 5B is a graph showing the evaluation results of the plate thickness deviation of the fuel cell separator of the comparative example.

Additionally, the plate thickness deviation of the obtained fuel cell separator of the comparative example was evaluated in the same manner as the example. The results are shown in FIG. 5B and Table 3. FIG. 5B is a graph showing the evaluation results of the plate thickness deviation of the fuel cell separator of the comparative example.

TABLE 3

| Maximum value | 1.035 (mm) |
|---|---|
| Minimum value | 0.962 (mm) |
| Average | 1.000 (mm) |
| Maximum − Minimum | 0.073 (mm) |
| Standard deviation | 0.019 (mm) |

From FIGS. 5A and 5B, and Tables 2 and 3, the difference between the maximum value and the minimum value of the plate thickness was 73 μm in the comparative example in which the mold provided with no dummy pattern was used. In contrast to this, the difference between the maximum value and the minimum value of the plate thickness was small, 32 μm, in the example in which the mold provided with the dummy pattern was used. Thereby, it can be confirmed that the sheet press molding method of the invention has an effect of reducing the plate thickness deviation of a molded product.

INDUSTRIAL APPLICABILITY

The invention can be applied to sheet press molding methods and methods of manufacturing a fuel cell separator.

REFERENCE SIGNS LIST 3a, 3b, 3c, 24b, 24c, 24d, 24e: RECESSED PORTION
10, 40: MOLD
1, 11, 201: BOTTOM MOLD
12, 212: TOP MOLD
3, 13: RECESS AND PROTRUDING PATTERN
13a, 13b, 13c, 13d, 23a, 23b, 23c, 23d: PROTRUDING PORTION
14: INSIDE
14b: SIDE SURFACE
20, 21: SHEET-SHAPED MATERIAL
23, 30, 130, 230: MOLDED PRODUCT
24: DUMMY PATTERN
24a, 224a: DUMMY PROTRUDING PORTION
31: FLOW CHANNEL PATTERN
32: RECESS AND PROTRUSION PATTERN PORTION
35: FUEL CELL SEPARATOR

The invention claimed is:

1. A sheet press molding method, comprising:
a process of forming a molded product having one or more flow channels to which a recess and protrusion pattern is transferred, by pressurizing a sheet-shaped material including a resin composition and 60 vol. % to 95 vol. % of a filler using a pair of molds, at least one of which has a predetermined recess and protrusion pattern composed of one or more recessed portions and one or more protruding portions, wherein
the pair of molds have a first mold and a second mold,
the first mold includes a channel pattern having one or more protruding portions disposed on the position corresponding to the flow channels, a dummy pattern having one or more dummy protruding portions, and one or more recessed portions which is formed between the protruding portions of the channel pattern, the dummy protruding portions, and the side surfaces of the inside of the first mold,
the dummy protruding portions are separated from the protruding portions of the channel pattern by the recessed portions, and
the total volume of the protruding portions of the channel pattern and the dummy protruding portions is same as the total volume of the recessed portions, wherein the total volume of the recessed portions refers to the volume of the recessed portions between an imaginary surface along the top surface of the first mold and the bottom of the recessed portions.

2. The sheet press molding method according to claim 1, wherein the protruding portions of the channel pattern and the dummy protruding portions have a uniform height, and the total area in which the protruding portions of the channel pattern and the dummy protruding portions are formed on the first mold is the same as the remaining area of the first mold where the protruding portions and the dummy protruding portions are not formed.

3. The sheet press molding method according to claim 1, wherein the dummy pattern is provided at a plurality of areas.

4. The sheet press molding method according to claim 1, wherein the sheet-shaped material has a uniform thickness.

5. The sheet press molding method according to claim 1, wherein the filler is a carbonaceous material.

6. The sheet press molding method according to claim 1, wherein the dummy protruding portions have widths that are not uniform with widths of the protruding portions of the channel pattern.

7. A method of manufacturing a fuel cell separator, comprising:
a process of forming a fuel cell separator having a flow channel recessed portion, to which a recess and protrusion pattern is transferred, by pressurizing a sheet-shaped material including a resin composition and 80 mass% to 98 mass% of a carbonaceous material using a pair of molds, at least one of which has a predetermined recess and protrusion pattern composed of recessed portions and protruding portions, wherein
the pair of molds have a first mold and a second mold,
the first mold includes a channel pattern having one or more protruding portions disposed on a position corresponding to the flow channels, a dummy pattern having one or more dummy protruding portions, and one or more recessed portions which is formed between the protruding portions of the channel pattern, the dummy protruding portions, and the side surfaces of the inside of the first mold,
the dummy protruding portions are separated from the protruding portions of the channel pattern by the recessed portions, and
the total volume of the protruding portions of the channel pattern and the dummy protruding portions is same as the total volume of the recessed portions, wherein the total volume of the recessed portions refers to the volume of the recessed portions between an imaginary surface along the top surface of the first mold and the bottom of the recessed portions.

8. The method of manufacturing a fuel cell separator according to claim 7, wherein the protruding portions of the channel pattern and the dummy protruding portions have a uniform height, and the total area in which the protruding portions of the channel pattern and the dummy protruding portions are formed on the first mold is same as the remaining area of the first mold where the protruding portions and the dummy protruding portions are not formed.

9. The method of manufacturing a fuel cell separator according to claim 7, wherein the dummy pattern is provided at a plurality of areas.

10. The method of manufacturing a fuel cell separator according to claim 7, wherein the dummy pattern is provided at locations corresponding to areas that become gas supply holes of the fuel cell separator.

11. The method of manufacturing a fuel cell separator according to claim 7, wherein the dummy protruding portions have widths that are not uniform with widths of the protruding portions of the channel pattern.

* * * * *